(12) United States Patent
Jadhav et al.

(10) Patent No.: US 10,719,478 B2
(45) Date of Patent: Jul. 21, 2020

(54) METHOD AND SYSTEM TO ENABLE REALTIME AVAILABILITY OF ACCESSIBLE CONTENT THROUGH MULTIMODAL, MULTICHANNEL ECOSYSTEM

(71) Applicant: TATA CONSULTANCY SERVICES LIMITED, Mumbai (IN)

(72) Inventors: Charudatta Vitthal Jadhav, Mumbai (IN); Umang Satish Kumar Shah, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 667 days.

(21) Appl. No.: 15/266,424

(22) Filed: Sep. 15, 2016

(65) Prior Publication Data
US 2017/0078364 A1 Mar. 16, 2017

(30) Foreign Application Priority Data
Sep. 15, 2015 (IN) .......................... 3541/MUM/2015

(51) Int. Cl.
| | |
|---|---|
| G06F 16/11 | (2019.01) |
| G06Q 30/06 | (2012.01) |
| G06F 21/16 | (2013.01) |
| G06F 40/103 | (2020.01) |
| G09B 21/00 | (2006.01) |
| G06Q 50/10 | (2012.01) |
| G06F 16/17 | (2019.01) |

(52) U.S. Cl.
CPC .......... G06F 16/116 (2019.01); G06F 21/16 (2013.01); G06F 40/103 (2020.01);
(Continued)

(58) Field of Classification Search
CPC .............. H04L 67/12; H04L 2209/608; H04L 2463/103; G06F 21/10; G06F 21/16;
(Continued)

(56) References Cited

U.S. PATENT DOCUMENTS 7,835,989 B1 * 11/2010 Hendricks .......... H04N 7/17318
705/50
9,178,744 B1 * 11/2015 Lattyak .................. G06Q 30/00
(Continued)

OTHER PUBLICATIONS

Library of Congress, "BARD Mobile Application User Guide", Mar. 30, 2015, The National Library Service for the Blind and Physically Handicapped, Version 1.0, pp. 1-26. (Year: 2015).*
(Continued)

*Primary Examiner* — Gregory G Todd
(74) *Attorney, Agent, or Firm* — Finnegan, Henderson, Farabow, Garrett & Dunner LLP

(57) ABSTRACT

A method and system is provided for enabling real-time availability of accessible format of a published document such as book, journal, newspapers etc. to the print disabled users using the technology platform, at the same time ensuring the interest of various stakeholder such as print disabled users, publishers, NGOs, universities, libraries etc. The technology platform is creating an eco-system in a particular country which can be integrated with an international eco-system of digital accessible publishing. The technology platform provides facility to the end user to access the book online or even request the library to provide the book offline and if any of desired books not available in the platform the same can also be requested by users for production by libraries. The accessible format can also be provided in various forms such online, audio, through post etc. as per the requirement of the user.

16 Claims, 6 Drawing Sheets

(52) U.S. Cl.
CPC ....... G06Q 30/0641 (2013.01); G09B 21/005 (2013.01); *G06F 16/173* (2019.01); *G06F 2221/0728* (2013.01); *G06F 2221/0733* (2013.01); *G06Q 50/10* (2013.01); *G09B 21/006* (2013.01); *G09B 21/007* (2013.01); *G09B 21/008* (2013.01)

(58) Field of Classification Search
CPC ................. G06F 40/103; G06F 16/116; G06F 2221/0728; G06F 2221/0733; G06Q 10/101; G09B 21/005–008
See application file for complete search history.

(56) References Cited

U.S. PATENT DOCUMENTS

| | | | | |
|---|---|---|---|---|
| 10,007,669 | B1* | 6/2018 | Forman | G06F 40/14 |
| 2003/0081336 | A1* | 5/2003 | Woodill | G11B 20/10527 |
| | | | | 360/32 |
| 2005/0091343 | A1* | 4/2005 | Murray, Jr. | H04N 1/00222 |
| | | | | 709/219 |
| 2006/0168507 | A1 | 7/2006 | Hansen | |
| 2014/0164915 | A1* | 6/2014 | Liu | G06F 40/20 |
| | | | | 715/249 |
| 2015/0012616 | A1* | 1/2015 | Pearl | H04L 67/1095 |
| | | | | 709/219 |
| 2016/0148538 | A1* | 5/2016 | Al-Busaidi | G09B 21/02 |
| | | | | 434/114 |

OTHER PUBLICATIONS

Library of Congress, "That All May Read", Jul. 2, 2015, National Library Service for the Blind and Physically Handicapped https://web.archive.org/web/20150706012616/http://www.loc.gov/programs/national-library-service-for-the-blind-and-physically-handicapped/about-this-service, pp. 1-3. (Year: 2015).*

* cited by examiner

METHOD AND SYSTEM TO ENABLE REALTIME AVAILABILITY OF ACCESSIBLE CONTENT THROUGH MULTIMODAL, MULTICHANNEL ECOSYSTEM

CROSS-REFERENCE TO RELATED APPLICATIONS AND PRIORITY

The present application claims priority from Indian provisional specification no. 3541/MUM/2015 filed on 15 Sep. 2015, the complete disclosure of which, in its entirety is herein incorporated by references.

TECHNICAL FIELD

The present application generally relates to a technology platform for building an eco-system in a particular country which can be integrated with an international eco-system of digital accessible publishing and catering the specific needs of various stake holders such as print disabled users, publishers, NGOs, universities, government, libraries etc. More particularly, but not specifically, the invention provides a real time method and system for providing accessible format of published document such as books, journals, newspapers etc. to the print disabled users using the technology platform.

BACKGROUND

UN Convention on the 'rights of persons with disabilities' has recognized right to information access to information and communication technologies is the basic human right. So that every individual is able to participate and contribute actively in the society. However, despite of releasing the importance of this right by 159 countries across the globe, a segment of this user group having visual, physical or cognitive disability is deprived of this knowledge and information which is available to the general public due to inaccessibility of the printed materials. These people make up this very large demographic find it difficult or impossible to read traditional paper-based as well as modern electronic documents. According to the World Blind Union, 1 million or so books gets published each year in the world and barely 5% are made available in accessible formats. Also there is limited availability of textbooks, real-time newspapers, publications & other information materials in accessible formats.

At the same time, the requirements of the users are also need to be taken care of. The needs of the user base in various developing countries is diverse as on one end we have technology savvy users, having access to high bandwidth and on the other end users who are not comfortable with technology and with no access to computers. There are people who still use the traditional way of reading like using cassette recorder or CD player and also some people use internet and can read digital books. But there is no single system currently available which can carter both the need of the users. Many NGO libraries have come forward which produce and distribute accessible format to people with disabilities at different locations. However, there is lack of visibility to end user about books available with these libraries across different locations. There is no mechanism to get the books from different location which are available in accessible format. User doesn't get the required books in real time due to lack of technology mainly the newspapers and periodicals.

To provide more accessibility of the published content or the accessible format to the print disabled users, various attempts have been made. Currently a number of universities have come up with websites catering specifically to the print disabled users. Various other web based and software based platforms have also been provided on the similar lines. In addition to that, the existing solutions are focused only towards the need of print disabled users. In addition to print disabled users, there are other stakeholders as well such as publishers and NGOs who willing to provide various services to those users.

From publisher's perspective, as per statistics, there is lack of publishing house/Publishers taking up the responsibility of making their works fully accessible to persons with print disabilities. The reasons behind this is either due to the unavailability of technology know how or technology support required to produce accessible format and also due to lack of inclusive process (integrating standards and guidelines of digital accessible publishing) place to provide assurances to authors and publishers that system will not expose their published works to misuse or distribution for circulation and used only by intended beneficiaries i.e. print disabled persons only. Publishers are not producing the accessible format due to lack of domain and technical knowledge and also not willing to share the soft copy/base format to organization who are capable of converting the content into accessible format due to potential commercial risk. There is no mechanism available where both the above mentioned points can be addressed.

In addition to above mentioned points, there are many NGO's are producing books in accessible format both in English as well as in regional language. NGO's mostly focuses on educational materials, novels, fictions etc. There could be multiple accessible copies of the same book getting produced and lying with multiple different libraries, which leads to duplication of work and unnecessary cost and effort spent. Also it leads to wastage of resource utilization. There is no way to exchange the books in accessible format between the libraries throughout the countries.

Because of the diverse needs and preferences of the users, the NGO's are unable to fulfil the needs of the users in preferred format. This is due to lack of technology and unavailable system. To cater the diverse needs of diverse user base there is no distribution system and infrastructure in place that can reach out to all the segments which complies with national law provisions that permit the reproduction, distribution and making available of published works in accessible formats.

Further, copyright law of few countries allow the NGO's to convert and print content in accessible format without the permission of author and publisher provided it is non-profit initiative and such content should be given only to bona fide print disable person. Currently there is no such processes or audit in place which can implement such recommendations and to verify these aspects. International law (Marrakesh treaty) allows cross border transfer of accessible formats with the conditions mentioned above. But there is no system in place which can verify that organization involved in distribution of accessible format are following International norms and copyright law of land.

Various other efforts have been made to provide a solution for above mentioned problems, but none of them have been convincing. A system is required which can cater the needs of each stake holders, i.e., print disabled users, publishers, NGOs and universities to ensure availability of accessible format to the print disabled users in real time, and in their preferred way and format.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

The present invention provides a method and system for enabling real-time availability of accessible format of a published document such as book, journal, newspapers etc. to the print disabled users using the technology platform, at the same time ensuring the interest of various stakeholder such as print disabled users, publishers, NGOs, libraries, universities etc.

The technology platform is creating an eco-system in a particular country which can be integrated with an international eco-system of digital accessible publishing. The international ecosystem may involve the international libraries of various other countries. The system acts as the interface to international libraries as per the Marrakesh treaty.

In view of the foregoing, an embodiment herein provides a system for enabling real-time availability of a published document to a print disabled person through multiple channels. The system comprises a user interface, a technology platform, a memory and a processor. The user interface generates a request by the user for the access of a published document. The user interface is at least one of a mobile phone, a computer or an interactive voice response system (IVRS). The technology platform is coupled with the user interface. The processor is coupled with the memory. The processor further comprises an inspection module. The inspection module checks the availability of an accessible format of the published document on the technology platform or a national catalogue. The processor further performs the steps depending on the availability of the accessible format on the technology platform or the national catalogue. In the first scenario, if the accessible format is available on the technology platform the national catalogue, then, the processor provides an online page to read the accessible format, if the request is made for online reading. The processor also provides a link to download the accessible format, if request is made for download. The processor also applies a watermarking using a watermarking module during the download of the accessible format to ensure the accountability of the user who is downloading. The process also provides a physical copy of the watermarked accessible format of published content, if the request is an offline request. And finally library sends the physical copy to the user over a mail, post or any other offline mode. In the second scenario, if the accessible format is not available on the technology platform or the national catalogue, then, the processor sends the request to a request pool in the technology platform. The request is visible to all the libraries registered in the technology platform. The request is picked by a library registered on the technology platform. The library gets the published content converted in to the accessible format using a conversion module. The library uploads the accessible format on the technology platform. And finally the accessible format is provided to the user based on the type of the request.

Another embodiment provides a method for enabling real-time availability of a published document to a print disabled person through multiple channels. Initially a request is generated by a user for the access of the published document on a technology platform. The request is generated using a mobile phone, a computer or an interactive voice response system (IVRS). In the next step, the availability of an accessible format of the published document is checked on the technology platform or a national catalogue. And the following steps are performed depending on the availability of the accessible format on the technology platform or the national catalogue. In the first scenario if the accessible format is available on the technology platform or the national catalogue, then an online page is provided to the user to read the accessible format, if the request is made for online reading. A link to download the accessible format is provided to the user, if request is made for download. In the next step, a watermark is also applied during the download of the accessible format to ensure the accountability of the user who is downloading. In the next step the physical copy of the watermarked accessible format of published content is provided, if the request is an offline request. And finally the physical copy is sent to the user over a mail, post or any other offline mode. In the second scenario, if the accessible format is not available on the technology platform or the national catalogue, then the request is sent to a request pool in the technology platform. The request is visible to all the libraries registered in the technology platform. In the next step, the request is picked by a library registered on the technology platform. In the next step, the published document is converted in to the accessible format. The accessible format is then uploaded on the technology platform. And finally, the accessible format is provided to the user based on the type of the request.

Another embodiment provides a method for enabling real-time availability of a published document to a print disabled person through a local library. Initially, a request is generated by a user for the access of the published document. The request is generated using a mobile phone, a computer or an interactive voice response system (IVRS). The request is then sent in a request pool on the technology platform. The request is visible to all the local library registered in the library. In the next step the request is picked by a local library. In the next step, the availability of accessible format is checked in other libraries of the technology platform. In the next step the accessible format is provided to the user if it is available. Else, in the next step, a source document of the published content is converted in to the print disabled accessible format either externally or using a conversion module of the technology platform. And finally, the accessible format is provided to the user by the local library through a preferred channel of the user. The local library who have picked up the request will also be responsible for regularly updating the status of the accessible format production and distribution to the user and other stakeholders.

In another embodiment, a non-transitory computer-readable medium having embodied thereon a computer program for enabling real-time availability of a published document to a print disabled person through multiple channels. Initially a request is generated by a user for the access of the published document on a technology platform. The request is generated using a mobile phone, a computer or an interactive voice response system (IVRS). In the next step, the availability of an accessible format of the published document is checked on the technology platform or a national catalogue. And the following steps are performed depending on the availability of the accessible format on the technology platform or the national catalogue. In the first scenario if the accessible format is available on the technology platform or the national catalogue, then an online page is provided to the user to read the accessible format, if the request is made for online reading. A link to download the accessible format is provided to the user, if request is made for download. In the next step, a watermark is also applied during the download of the accessible format to ensure the accountability of the user who is downloading. In the next step the physical copy of the watermarked accessible format of published content is provided, if the request is an offline request. And finally the physical copy is sent to the user over a mail, post or any other offline mode. In the second scenario, if the accessible format is not available on the technology platform or the national catalogue, then the request is sent to a request pool in the technology platform. The request is visible to all the libraries registered in the technology platform. In the next step, the request is picked by a library registered on the technology platform. In the next step, the published document is converted in to the accessible format. The accessible format is then uploaded on the technology platform. And finally, the accessible format is provided to the user based on the type of the request.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
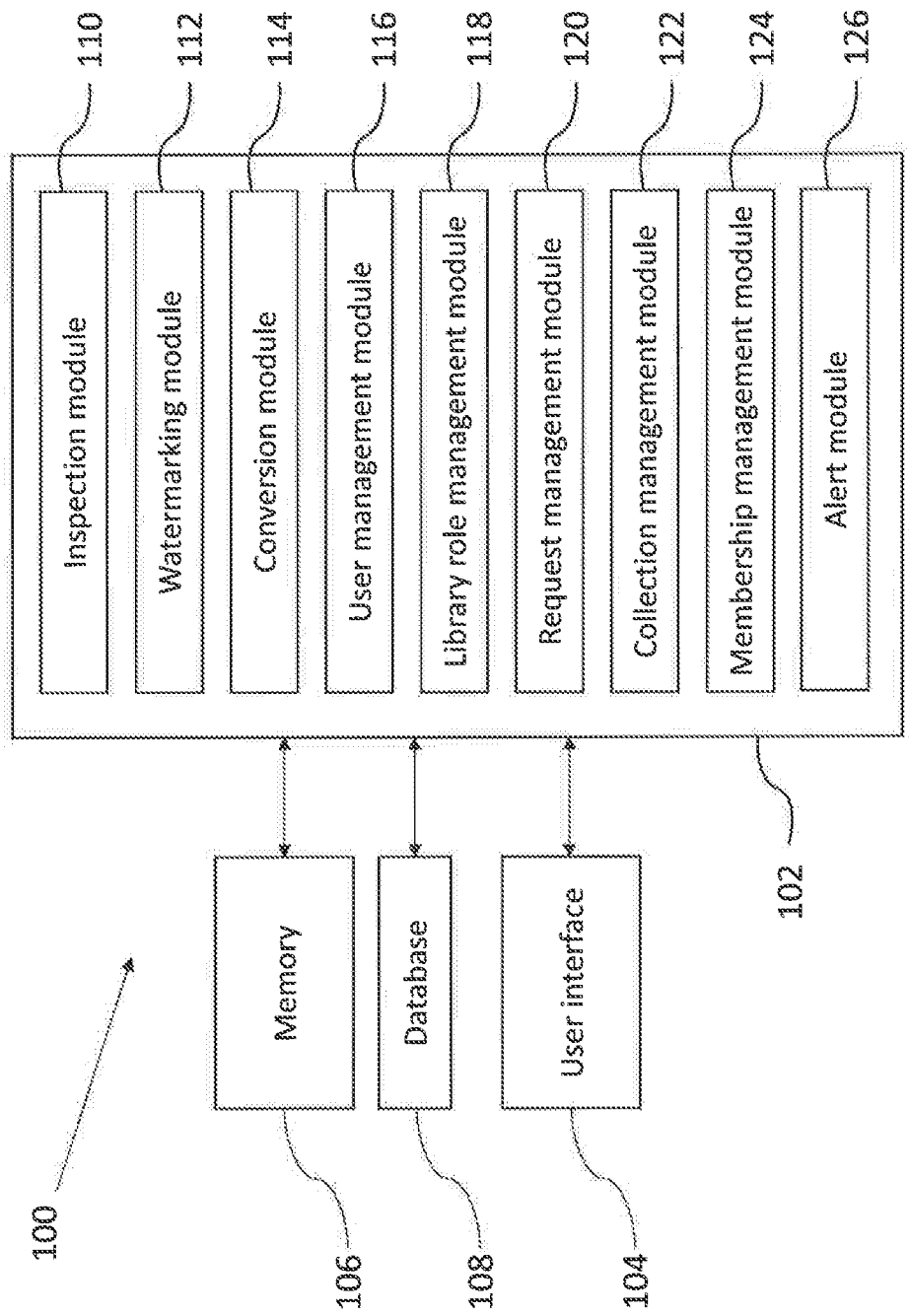
FIG. 1 illustrates a block diagram of a system for providing accessible format to the print disabled person using a single technology platform in accordance with an embodiment of the disclosure.

Referring now to the drawings, and more particularly to FIG. 1, where similar reference characters denote corresponding features consistently throughout the figures, there are shown preferred embodiments and these embodiments are described in the context of the following exemplary system and/or method.

FIG. 1 illustrates a schematic block diagram of a system 100 for providing real-time availability of accessible format or published content accessible to print disabled users through multimodal, multichannel eco-system using a single technology platform. It should be appreciated that the term 'technology platform' and 'library platform' will be used replaceable in the disclosure. The invention provides a kind of eco-system which can be used by a plurality of users. The single technology platform is a national accessibility library platform (NALP). National Accessibility Library Platform (NALP) is a multimodal platform and multichannel system where individuals who have print disability such as learning disability, visual impairments etc. can access any type of content in accessible form. The system 100 includes various stakeholders such as print disabled users, a plurality of libraries, a plurality of publisher and non-government organizations (NGOs), which becomes part of the single technology platform. The system 100 can be used to provide all kind of published content on the technology platform, for example books, publication articles, newspapers and other periodical magazines.

The technology platform is building an entire eco-system in a particular country which can be integrated with an international eco-system of digital accessible publishing. First of all the technology platform is integrated with national repository of government of any country. As per rule, whenever a new book is submitted for copyright protection, then the publishers also need to submit the digital content of the book. Creating an interfaces with national level and international system, global ecosystem.

According to an embodiment of the disclosure, the accessible format can be accessed by multiple channels as follows: Web and Mobile Online download, online reading, offline Request (CD and Desktop based), Interactive voice response (IVR/IVVR)—Online reading and Offline request, HW Daisy and epub3 players using online daisy protocol. There could be various scenarios where there is a need for using the multiple channels to access the book. In another scenario, the use of multiple channel is required in order to enhance the user experience The accessible format generally involves a diverse collection of books with different languages available in various accessible formats for print disabled people and the books produced anywhere can reach the user anywhere. The technology platform also enables the user to request and access the real-time content like newspapers, magazines, books in variety of standard accessible formats.

The system 100 includes a processor 102, a user interface 104, a memory 106 coupled with the processor 102 and a database 108 as shown in FIG. 1. The processor 102 is configured to read a plurality of algorithms stored in the memory 106 to perform various functions. The processor 102 further includes a plurality of modules such as an inspection module 110, a watermarking module 112, a conversion module 114, a user management module 116, a library role management module 118, a request management module 120, a collection management module 122, a membership management module 124 and an alert module 126. In addition to those, the processor 102 may also include plurality of other modules for performing various functions.

The technology platform has digitized process in place for the registration of guest users, end users, library and publishers. The guest user will be able to download the published content which are available for free. The end user will be a user with the print disability. The user registration is done to ensure that the technology platform is accessible only to individual with print disabilities and the platform is used by intended beneficiaries. Before starting the use of the technology platform, the user needs to be registered on the technology platform/technology platform using the user interface 104. The users can register with the technology platform by navigating to the signup page. The user needs to provide his personal details such as name, address, a preferred user-id and email address. The system 100 then sends a notification to the provided email address. Once the system 100 receives a confirmation from the provided email address, the user is considered to have signed up as a guest user. Once the user signs up as a guest he can search/browse accessible published content and can download a few selected of them. However, he cannot read all the books online or download any book other than a set of selected books.

To sign up as an end user of the technology platform, the user has to provide some information regarding his disability along with the disability certificate. Also, the user should choose primary local library of which he would like to be a member of. Once he has requested the membership to the technology platform, the administrator of the chosen local library will log into the system and verify complete user provided information along with his disability certificate. If the information is found to be genuine then the user is granted membership. Then the user becomes a regular user, who can also read books online, request off line delivery and download books.

Similarly, the technology platform also registers a library. A profile of the library is created. The request for the registration of any library can be approved or disapproved by the admin of the national library. Further the technology platform can also register a publisher. A profile of the publisher is created. The request for the registration of any publisher can be approved or disapproved by the admin of the national library.

According to an embodiment of the disclosure, the system 100 also includes the user management module 116. It should be appreciated that the user management module 116 can be configured to provide a selective access to the users. The guest user or the regular user can also be assigned the role of a super administrator of any local library, administrator of any local library, librarian of any local library, production manager of any local library, validators for validating any book, administrator of national library and chief librarian of national library etc.

According to an embodiment of the disclosure the system 100 can be implemented with collaboration with a plurality of libraries. The plurality of libraries further include a national library and a plurality of local libraries. The national library hosts the technology platform through which books would be provided to the user by the plurality of local libraries. The plurality of local libraries would need to register with the technology platform. When the local library registers, the local library details need to be provided along with the details of a single point of contact (SPOC). The administrator or super administrator of the national library would approve the membership of the local library. When membership is approved, the SPOC would become the super administrator of that local library and he will be entrusted with roles management at the local library. In another embodiment, the administrator or super administrator of the national library can also revoke a library or end user membership. In that case, post revocation, the library will no longer be part of the technology platform system hosted by the national library. The system 100 also includes the library role management module 118. The library role management module 118 is configured to provide selective roles to the officials of the library on the technology platform. Any local library official can have roles defined as following: Super Administrators: Super administrators would have all rights to alter any data associated with the specific library. Administrators: Library administrators may create user accounts (like guest users) and assign different roles to them. He/She may also assign different roles to the existing users. He/She would be responsible for approving user memberships. Librarians: Librarians would be responsible for downloading and distributing books. Production Managers: Production managers are responsible for producing and uploading accessible books, but they will not have access to national combined catalogue.

According to an embodiment of the disclosure, the user can generate a request to access of the published document using the user interface 104. The request can be generated using a mobile phone, a computer or an interactive voice response system (IVRS). Though it should be appreciated that the request can also be generated using any other communication device. Once the request if generated then the inspection module 110 checks the availability of the accessible format of the published content on the technology platform and a national catalogue. The national catalogue is a kind of database having the list of all the books which are available in the accessible format in a particular nation. The national catalogue is collective repository for all the libraries who are providing accessible format of the published content to the print disabled users. For example in India, there are approximate 131 libraries who provide the published content for print disabled users. The technology platform is integrated with various international libraries such as Bookshare, TIGAR platform provided by WIPO.

According to an embodiment of the disclosure, there are two scenarios depending on the availability of the accessible format on the technology platform and the national catalogue.

In the first scenario, the accessible format is available either on the technology platform or the national catalogue. The processor 102 provides an online page to read the accessible format if the request is made for the online reading. The processor provides a link to download the accessible format if the request is made for the download. It should be appreciated that at the time of download a watermarking needs to be provided using the watermarking module 112. According to an embodiment of the disclosure, a text watermarking module is provided for applying the text watermark on the accessible format during the download if the accessible format is in the text form. According to another embodiment of the disclosure, an audio watermarking module is provided for applying the audio watermark on the accessible format during the download if the accessible format is in the form of an audio file. The watermarking ensures the accountability of the user who is downloading the accessible format. According to an embodiment of the disclosure, the processor 102 is also configured to provide a physical copy of the accessible format if the request is an offline request. The physical can be sent to the user over a mail, postal service or any other similar service.

In the second scenario, if the accessible format is not available on the technology platform and the national catalogue. The request for the accessible format goes in to a request pool of the technology platform. The request will be visible to a plurality of local libraries registered with the technology platform and can be taken up by any of them for production. The local library decides to take up the request of that book, needs to change the status of the book request so that it's visible to all other local libraries in order to avoid the duplicate production of the same book. The library who have picked up for the production will ensure the conversion of the published document in to the accessible format. That local library will then be responsible for regularly updating the status of the book production and making that book available to the user. Once the book is produced, national library will assign a validator to validate the book and once validated, that book will be available for download in the technology platform.

The content conversion of the published document can be done externally or through the conversion module 114. The conversion module 114 is configured to convert the format of accessible format in another print disabled user's accessible format. If any of the book is not available in desired format the technology platform can request for the content conversion from various formats (HTML, XHTML, and structured Doc/RTF) to different accessible formats like DAISY text and Audio, EPUB3, Braille. It should be appreciated that the use any type of conversion technique is well within the scope of this invention.

In another embodiment, the request can also be generated by using the IVRS facility. The IVRS facility caters the needs of users from rural area that does not have access to the internet. Voice and DTMF input has been used to search the title through IVR system. IVR is connected to the technology platform. It should be appreciated that the speech recognition techniques (ASR) can also be used for the same. The user reads the title online using online daisy protocol. It should be appreciated that the mobile IVR can also be used to enhance the user experience to have better service delivery. In this facility, the user can log the request for the accessible format, which can later be provided to the user through post or email.

According to an embodiment of the disclosure, the system 100 can also be used by the local libraries. There are various local libraries who work as NGOs who are working for the benefit of print disabled person. The interested local libraries or the NGOs are registered on the technology platform. Initially, a request is generated by a user for the access of the published document. The request is then sent in a request pool on the technology platform. The request is also visible to all the local libraries registered in the library. In the next step the request is picked by a local library. The local library then check the availability of accessible format in other libraries of the technology platform. If the accessible format is available then, the accessible format is provided to the user. Else, a source document of the published content is converted by the local library in to the print disabled accessible format either externally or using a conversion module of the technology platform. And finally, the accessible format is provided to the user by the local library through a preferred channel of the user. The local library who have picked up the request will also regularly updating the status of the accessible format production and distribution to the user.

According to an embodiment of the invention, the system 100 also secures accessible format from the publisher for exclusive circulation by providing the content protection features like digital watermarking to ensure copyright protection. The technology platform has digitized process in place for securing accessible format by providing the content protection features like digital watermarking to ensure copyright protection. The accessible format generated by the conversion module 114 can be either in the text format or the audio format. The text format accessible format can be watermarked by using the text watermarking module 116. The audio format accessible format can be watermarked by using the audio watermarking module. Thus it should be appreciated that, each and every content which is getting downloaded or distributed offline through the technology platform need to be watermarked using either the text watermarking or the audio watermarking.

According to an embodiment of the disclosure, the system 100 provides a multi-channel platform. The multi-channel can include a web, mobile, IVR, hardware DAISY player-based platform to facilitate the print disabled users to search books, browse book, request books, read books online and download books in accessible format from a plurality of libraries. It should be appreciated the technology platform further includes an advanced search form author that allows the users to search by Author, Title, ISBN, Publisher, Synopsis, Language, Education Category (i.e., high school, college, university), Category etc.

According to another embodiment of the invention, the system 100 also provide a feature to secure the publisher manuscripts of the accessible format in the technology platform. As soon as the accessible format is reproduced, the original manuscript is removed from the technology platform.

According to an embodiment of the invention, the request management module 120 can be configured to manage a plurality of requests as follows: user's library membership request, publisher's membership request, user's book request, new book upload request, new book validation request, book metadata validation request, book metadata correction request, book re-upload request, offline book request and book conversion request.

Figure 3:
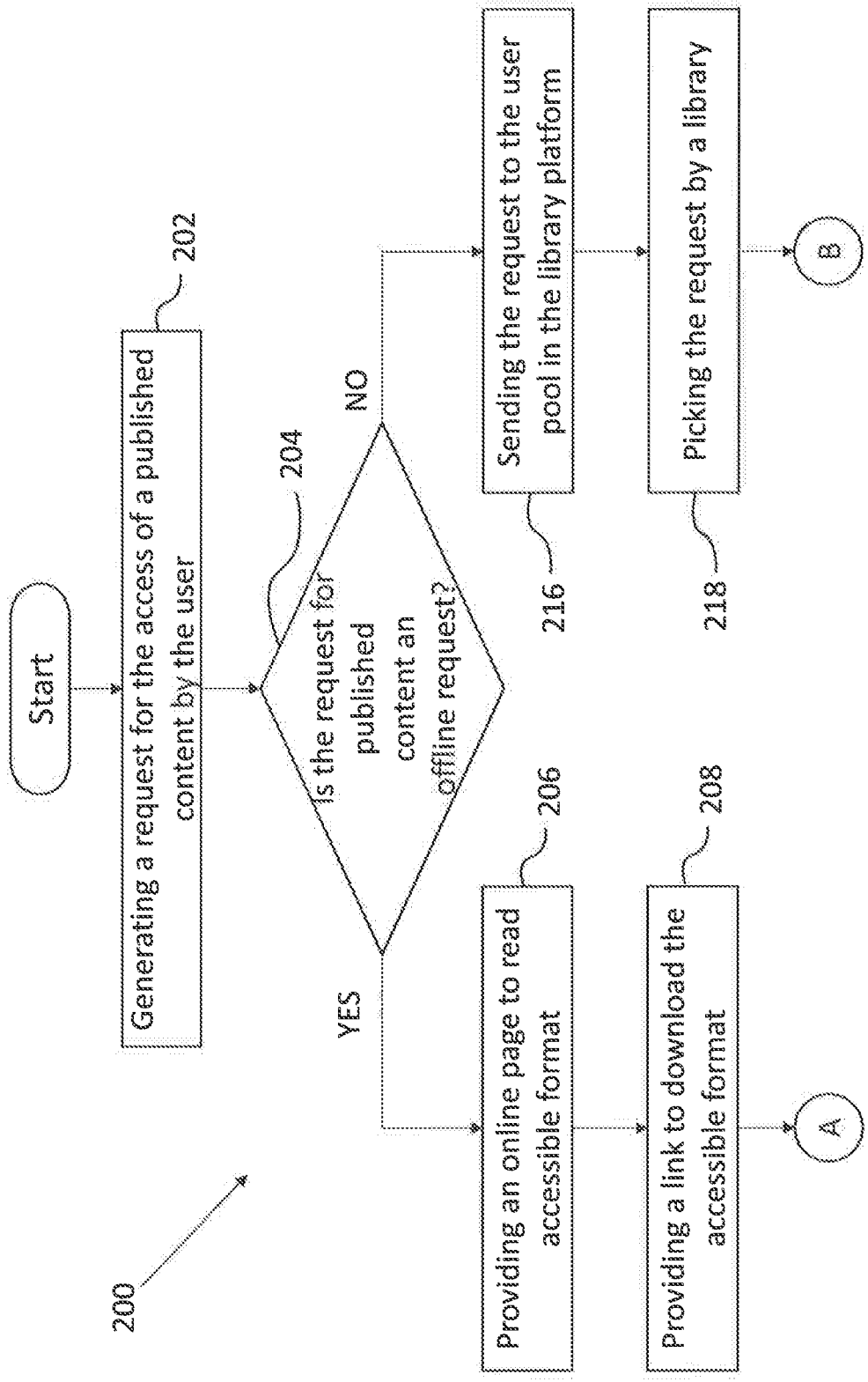
FIG. 3 shows a flow chart illustrating steps involved in accessing the accessible format by the print disabled user on the single technology platform in accordance with another embodiment of the disclosure.
Figure 3:
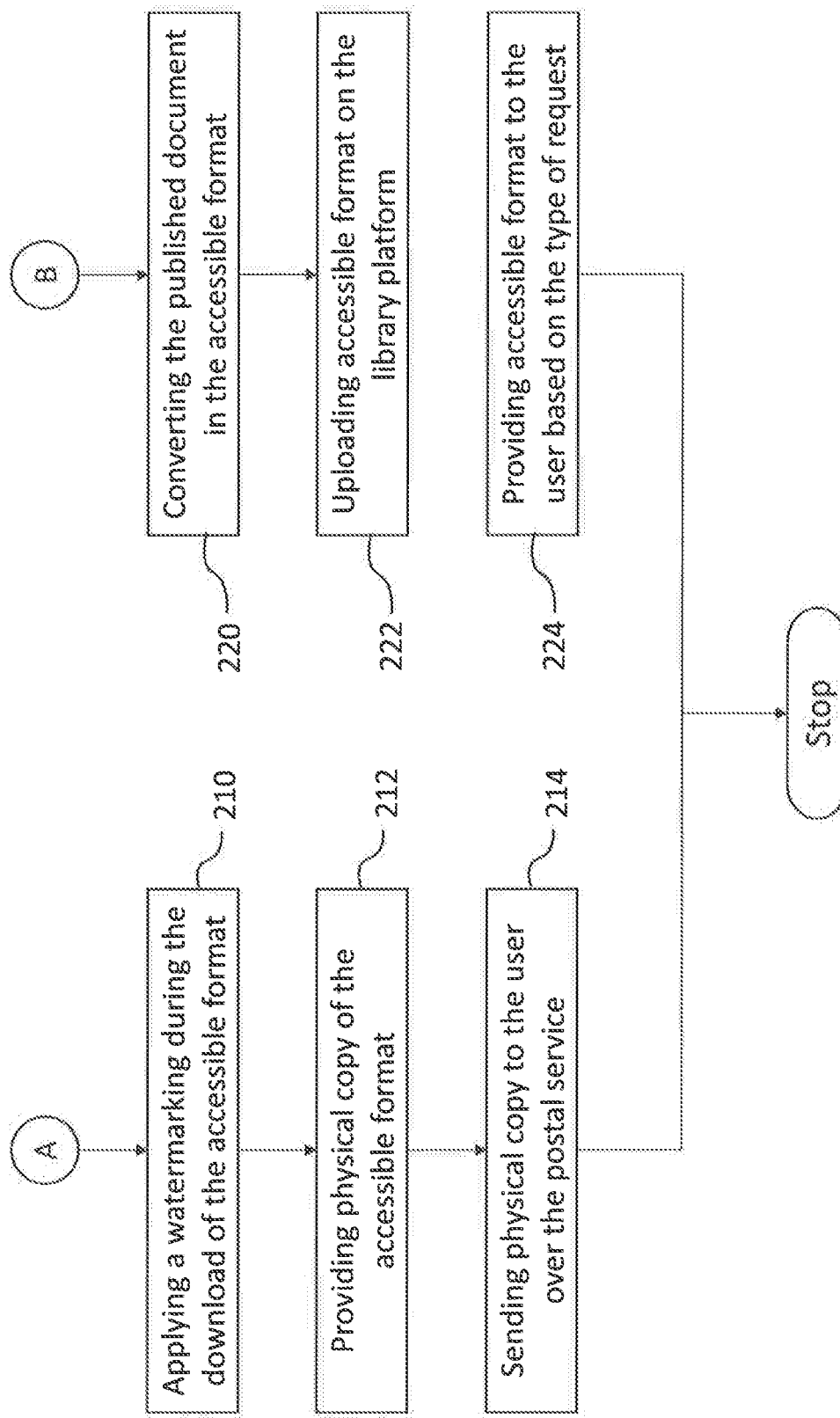

A flowchart 200 illustrating the steps involved in providing the accessible format to a print disabled user through multimodal, multichannel eco system using a single technology platform is shown in FIG. 3 according to an embodiment of the invention. The technology platform is National Accessibility Technology platform (NALP) or technology platform. Initially at step 202, a request is generated by the user for the access of the published content, it should be appreciated that in an example, the request can be generated using web, IVRS, mobile etc. The technology platform contains the national library and the plurality of local libraries. In addition to that the technology platform can also register users and publishers. The users could be a guest user or an end user. The end user is the user with the print disability. The regular user and the guest user have different type of access on the technology platform as explained above.

In the next step at 204, the availability of the accessible format is checked on the technology platform and the national catalogue using the inspection module 110. Based on the availability of the accessible format following steps are performed. If the accessible format is available at the technology platform or the national catalogue then at step 206, an online page is provided to the user to read the accessible format, if the request is made for online reading. At step 208, a link to download the accessible format is provided to the user, if request is made for download. In the next step 210, the watermarking is provided before the download of the accessible format, the watermarking is provided to maintain the copyright of the publishers. In addition to that, the watermarking is not only to protect the copyright of publisher. It is also important implementation for regulatory compliances of a particular country. The national copyright law and the Marrakesh treaty-international law which help to track authorized user and book the legal responsibility event of miss use. In this way also maintaining the interests of the publisher by avoiding misuse of the accessible format. The watermark can be provided either using the text watermarking or the audio watermarking. At step 212, the physical copy of the watermarked accessible format of the published content is also provided if the request is the offline request. And in the next step 214, the physical copy is sent to the user over a mail, post or any other postal service.

In the other scenario, if the accessible format is not available at the technology platform or the national catalogue then at step 216, the request is sent to the request pool in the technology platform. This request will now be visible to all the libraries registered in the technology platform. At step 218, the request is then picked by any library. In the next step 220, the published document is then converted in to the accessible format using external utility or conversion module 114. At next step 222, the accessible format is uploaded on the technology platform. And finally at step 224, the accessible format is then provided to the user based on the type of request.

Figure 2:
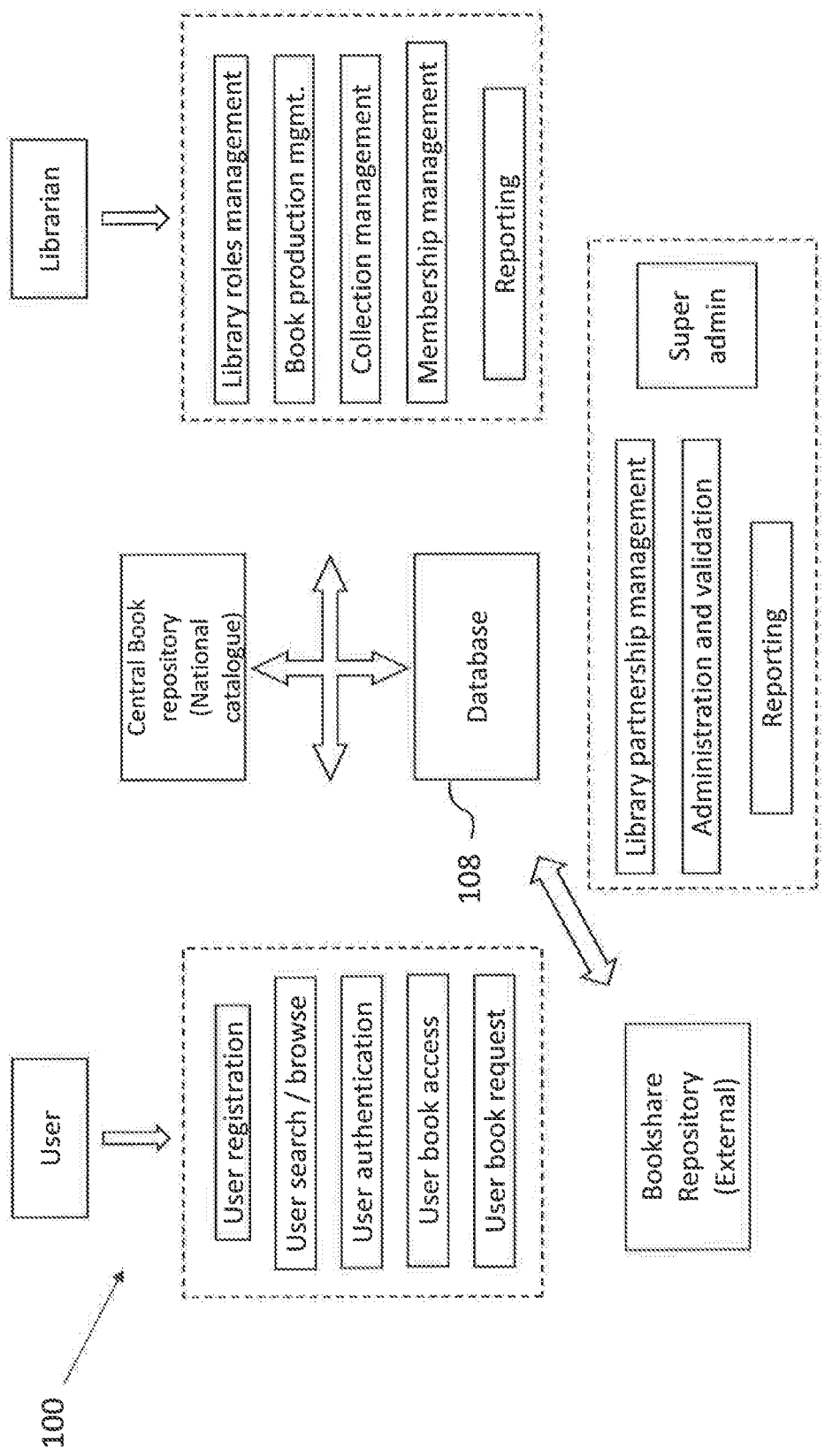
FIG. 2 shows a functional architecture of the system for providing accessible format to the print disabled person using the technology platform in accordance with an embodiment of the disclosure.

According to an embodiment of the invention the system 100 further includes a collection management module 122 as shown in FIG. 2. The books within a library need to be categorized correctly. Each book in the technology platform would need to be annotated with proper keywords, summary details etc. to facilitate searching. This would be done by the librarian of local library.

According to an embodiment of the invention the system 100 further includes a membership management module 124 as shown in FIG. 2. The membership management module 124 manages the new membership requests in the technology platform. The plurality of local libraries need to approve/reject new membership requests. The local library would have the rights to revoke/cancel the membership of the users registered with itself. Membership approval is done by the administrator of the local library.

According to an embodiment of the disclosure, the system 100 further includes an alert module 126. The alert module 126 is configured to send the alerts to the user about the request generated by the user. The alerts can be sent using email, SMS or any other mode of communication.

According to another embodiment of the disclosure, the system 100 further comprises an interface to integrate with a national repository. The interface is configured to automatically fetch the information whenever a new title is registered in the nation repository. The interface will automatically help in generating the accessible format of that title as soon as the Title is updated in the national repository. This way the system 100 provides a real time automated method of converting the new publication into the accessible format.

Figure 4:
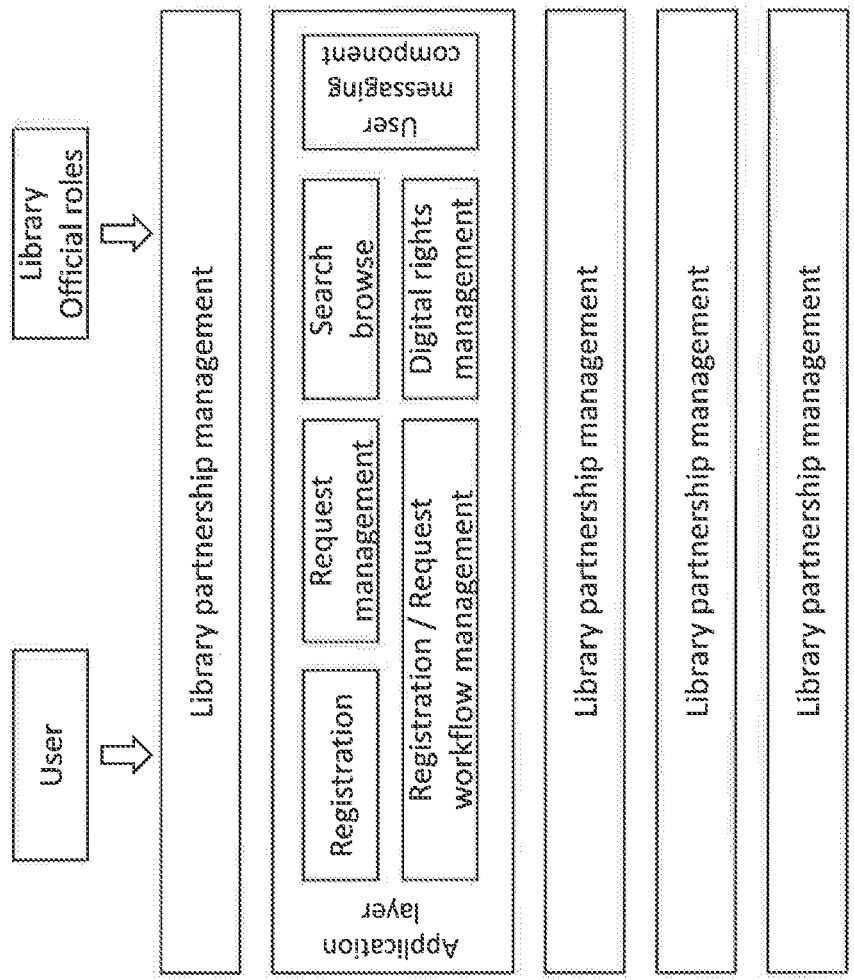
FIG. 4 shows a technical architecture of the system for providing accessible format to the print disabled person using the single technology platform in accordance with an embodiment of the disclosure.

According to an embodiment of the disclosure, the technology architecture of the system 100 is shown in FIG. 4. The system architecture includes three layers: presentation layer, application layer and data access layer. The presentation layer consists of the user interface of the system 100. The user interface is developed using HTML 5, CSS 3. Java Script, jQuery 1.7 and Bootstrap 1.0 and is responsive to the screen size of the device being used to access NALP. The layout of the user interface appears different when viewed from a mobile phone than when viewed from the desktop.

The application layer houses the business logic components. The key components in the application layer would include registration, request management, search/browse, workflow management, DRM and user management. The web framework of the application layer is Strut2 (version 2.4) and the application framework is Spring 3.x. The application layer would use a REST based web service to connect to the external Bookshare system for searching and browsing of books. The application layer also provides a web service end point that allows endpoint connection to a mobile UI application.

The data access layer serves as a bridge between the business logic components and the database and help retrieve data from and save data to the database. The data access layer would consist of the object relational mapper that that would map database entities with system entities defined in object oriented classes.

Figure 5:
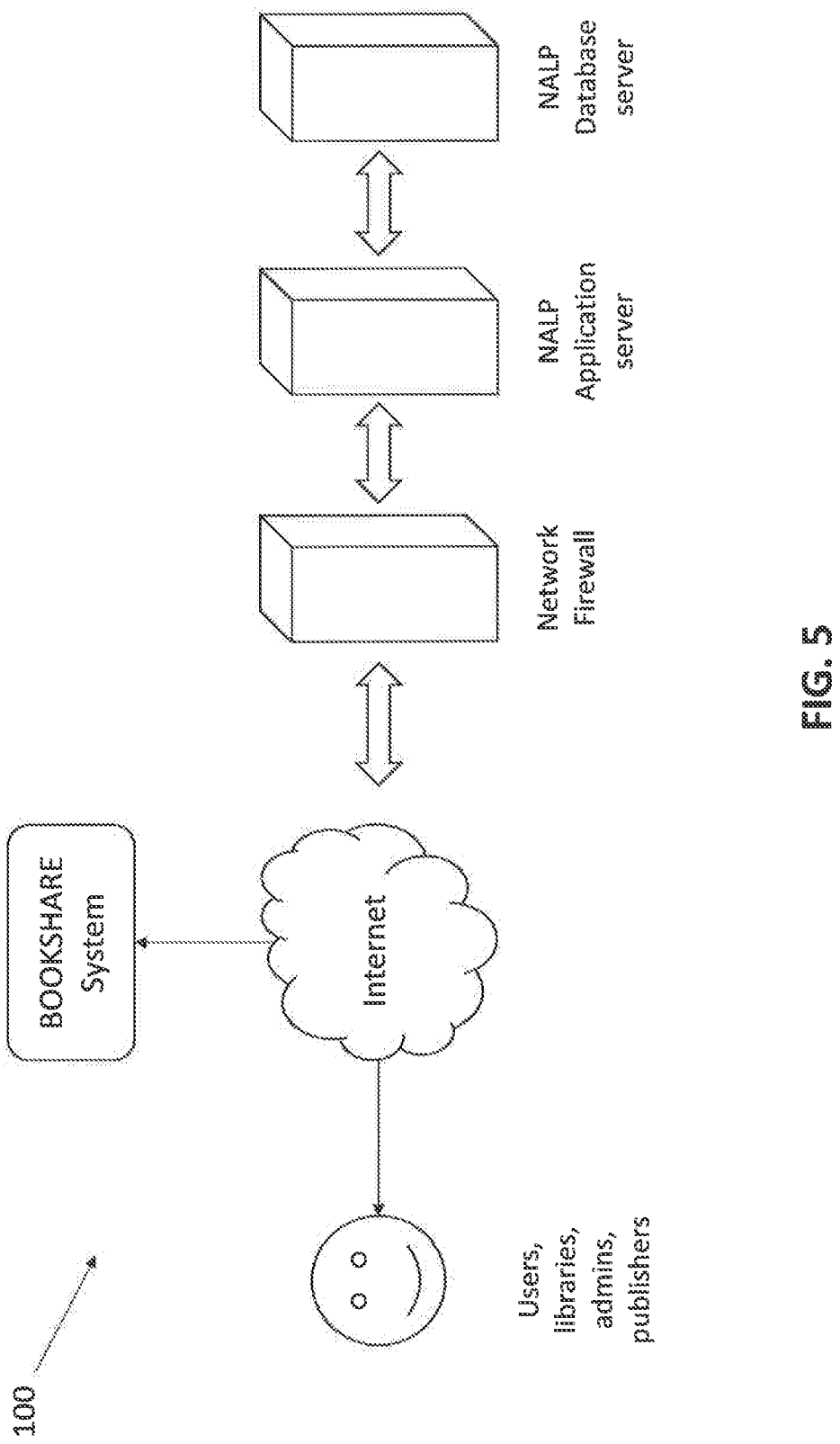
FIG. 5 shows a deployment architecture of the system for providing accessible format to the print disabled person in accordance with an embodiment of the disclosure.

According to an embodiment of the disclosure, a deployment architecture diagram of the system 100 is shown in FIG. 5. Apache Tomcat 6.x/7.x is the application server required for the deployment of NALP. Apache Tomcat needs Java JDK/JRE to be run. The NALP would be built using ANT 1.7 (Another Neat Tool) build script build.xml provided with the source. The resulting WAR (Web ARchival) file NALP.war would be deployed in $CATALINA_HOME/ webapps directory of Apache Tomcat 6.x/7.x. Here $CATALINA_HOME is base directory of Tomcat 6.x/7.x. Apache Tomcat would need to be stopped before the NALP.war file is placed in the webapps folder. Once Apache Tomcat is started, then the webapps/NALP directory would be created. All accessible format would need to be stored in the webapps/NALP/Book_Catalogue folder.

Another functionality of the system 100 is to provide the feature of a new book upload. The new book can be uploaded by the production manager or the publisher. The new book is uploaded either through conversion utility or by direct upload. After the upload the validators conducts the technical validation of the book and the chief librarian conducts the metadata validation of the new book.

Yet another functionality of the system 100 is to provide periodical publications such as magazine and newspapers. The production manager creates the periodical profile which will be approved/sent back/Rejected by the chief librarian. The end user can subscribe/unsubscribe to the periodical publications.

Yet another functionality of the system 100 is the bulk upload of books or Users. The national library super admin will uploads the books or users through excel upload.

Yet another functionality of the system 100 is the new book requests and the offline book requests. The users places the request for new book in the system 100. Any library can pick up the book for production. Once ready, book will be uploaded by the production manager in to the system 100. The user can also place the offline book request. The offline book request is catered by the librarian of the library.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims. The embodiment, thus provides the system and method for enabling real-time availability of the published document to a print disabled person through multiple channels.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method to enable real-time availability of a published document to a print disabled person through multiple channels, the method comprising a processor implemented steps of:
   generating a request by a user to access the published document in a print disabled accessible format, wherein the request is generated using a mobile phone, a computer or an interactive voice response system (IVRS);
   checking the availability of the print disabled accessible format of the published document on a technology platform or a national catalogue; and
   performing following steps depending on the availability of the print disabled accessible format on the technology platform or the national catalogue, the steps comprising:
   a) if the print disabled accessible format is available on the technology platform or the national catalogue, then
      providing, by the processor, one of an online page to read the print disabled accessible format or, a link to download the print disabled accessible format;
      wherein a watermarking is applied during the download of the print disabled accessible format to ensure accountability of the user, wherein the watermarking is a text watermarking if the print disabled accessible format is a Braille format and the water marking is an audio watermarking if the print disabled accessible format is one of an audio book, a Daisy protocol or epub3 book; or
   b) if the print disabled accessible format is not available on the technology platform or the national catalogue, then
      automatically converting, by the processor, the published document into the print disabled accessible format, wherein the published document is converted in real-time to one of print disabled accessible formats comprising a DAISY text and audio, EPUB3, or Braille; and
      providing the published document in the print disabled accessible format to the user via the online page or the download of published document in the print disabled accessible format, wherein the watermarking is applied during the download of the print disabled accessible format to ensure the accountability of the user.

2. The method of claim 1 further comprising securing rights of a publisher by,
   securing a source document of the published content from a publisher, converting the source document in the accessible format, and deleting, by the processor, the source document.

3. The method of claim 1 further comprising the step of updating the status of accessible format production and distribution on the technology platform.

4. The method of claim 1, wherein the published document is at least one of a book, a publication article, a periodical magazine, or a newspaper.

5. The method of claim 1, wherein the user is a print disabled person or a representative of an authorized non-government organization (NGO) on behalf of the print disabled person.

6. The method of claim 1, further comprising the step of validating the user if the user is a blind person by checking the print disability certificate of the user.

7. The method of claim 1 further comprising sending alerts to the user about the current status of the request generated by the user.

8. A system to enable real-time availability of a published document to a print disabled person through multiple channels, the system comprising:
   a user interface to generate a request by the user to access of a published document in a print disabled accessible format, wherein the user interface is one of a mobile phone, a computer or an interactive voice response system (IVRS);
   a technology platform coupled with the user interface;
   a memory; and
   a processor coupled with the memory, wherein the processor comprises,
   an inspection module for checking the availability of the print disabled accessible format of the published document on the technology platform or a national catalogue, wherein the processor further configured to perform a plurality of steps depending on the availability of the print disabled accessible format on the technology platform or the national catalogue, the plurality of steps comprising:
   a) if the print disabled accessible format is available on the technology platform or the national catalogue, then
   providing at least one of an online page to read the print disabled accessible format, or providing a link to download the print disabled accessible format,
   wherein a watermarking is applied during the download of the print disabled accessible format to ensure accountability of the user, wherein the watermarking is a text watermarking if the print disabled accessible format is a Braille format and the water marking is an audio watermarking if the print disabled accessible format is one of an audio book, a Daisy protocol or epub3 book; or
   b) if the print disabled accessible format is not available on the technology platform or the national catalogue, then automatically converting the published document into the print disabled accessible format using a conversion module, wherein the published document is converted in real-time to one of print disabled accessible formats comprising a DAISY text and audio, EPUB3, or Braille; and
   providing the accessible format in the print disabled accessible format to the user via the online page or the download of published document in the print disabled accessible format, wherein the watermarking is applied during the download of the print disabled accessible format to ensure the accountability of the user.

9. The system of claim 8 further comprising a user management module configured to provide a selective access of the technology platform to the user.

10. The system of claim 8 further comprising a library role management module configured to provide selective roles to the officials of the library on the technology platform.

11. The system of claim 8 further comprising a collection management module configured to manage a plurality of books in the technology platform.

12. The system of claim 8 further comprising a membership management module for managing the membership of a new user on the technology platform.

13. The system of claim 8 further comprising an interface to integrate with a national repository.

14. The system of claim 8, wherein the technology platform includes a feature of advanced searching by author, title, ISBN, publisher, synopsis, language, education category of the published content.

15. The system of claim 8 further comprising an alert module for sending alert to the user about the request generated by the user.

16. A non-transitory computer-readable medium having embodied thereon a computer program to enable real-time availability of a published document to a print disabled person through multiple channels, the computer program performing a method comprising:
   generating a request by a user to access the published document in a print disabled accessible format on a technology platform, wherein the request is generated using a mobile phone, a computer or an interactive voice response system (IVRS);
   checking the availability of the print disabled accessible format of the published document on a technology platform or a national catalogue; and
   performing following steps depending on the availability of the print disabled accessible format on the technology platform or the national catalogue, the steps comprising:
   a) if the print disabled accessible format is available on the technology platform or the national catalogue, then
   providing, by the processor, one of an online page to read the print disabled accessible format or, a link to download the print disabled accessible format;
   wherein a watermarking is applied during the download of the print disabled accessible format to ensure accountability of the user, wherein the watermarking is a text watermarking if the print disabled accessible format is a Braille format and the water marking is an audio watermarking if the print disabled accessible format is one of an audio book, a Daisy protocol or epub3 book; or
   b) if the print disabled accessible format is available on the technology platform or the national catalogue, then
   automatically converting, by the processor, the published document into the print disabled accessible format, wherein the published document is converted in real-time to one of print disabled accessible formats comprising a DAISY text and audio, EPUB3, or Braille; and
   providing the published document in the print disabled accessible format to the user via the online page or the download of published document in the print disabled accessible format, wherein the watermarking is applied during the download of the print disabled accessible format to ensure the accountability of the user.

* * * * *